United States Patent [19]

Dietz

[11] 4,235,746

[45] Nov. 25, 1980

[54] POLYMERIZATION OF OLEFINS

[75] Inventor: Richard E. Dietz, Bartlesville, Okla.

[73] Assignee: Phillips Petroleum Company, Bartlesville, Okla.

[21] Appl. No.: 4,122

[22] Filed: Jan. 17, 1979

[51] Int. Cl.$^2$ ............................................. C08F 4/64
[52] U.S. Cl. ............................. 252/429 C; 526/124; 526/125
[58] Field of Search .................................. 252/429 C

[56] References Cited

U.S. PATENT DOCUMENTS

| | | | |
|---|---|---|---|
| 2,954,367 | 9/1960 | Van den Berg | 252/429 C X |
| 3,050,471 | 8/1962 | Anderson et al. | 252/429 C |
| 3,316,314 | 4/1967 | Van den Berg | 252/429 C X |
| 3,644,318 | 2/1972 | Diedrich et al. | 252/429 C X |
| 3,676,414 | 7/1972 | Diedrich et al. | 252/429 C X |
| 3,718,636 | 2/1973 | Stevens et al. | 252/429 C X |
| 3,784,481 | 1/1974 | Lassau et al. | 252/429 C X |
| 3,801,558 | 4/1974 | Fletcher et al. | 252/429 C X |
| 3,821,186 | 6/1974 | Grant | 252/429 C X |
| 3,859,231 | 1/1975 | Kochhar et al. | 252/429 B X |
| 3,878,124 | 4/1975 | Durand et al. | 252/429 B X |
| 3,901,863 | 8/1975 | Berger et al. | 252/429 C X |
| 3,993,588 | 11/1976 | Thukral | 252/429 C |
| 4,006,101 | 2/1977 | Matsuura et al. | 252/429 C |
| 4,021,599 | 5/1977 | Kochhar et al. | 252/429 C X |
| 4,133,824 | 1/1979 | Malpass et al. | 252/429 C X |

*Primary Examiner*—Patrick Garvin

[57] ABSTRACT

A process for polymerizing alpha-olefins in the presence of a catalyst comprising two components. Component A is obtained by mixing a magnesium dihydrocarbyloxide compound with a tetravalent, halogenated titanium compound and then contacting the resultant product with a dihydrocarbylmagnesium compound. Component B comprises a metallic hydride or an organometallic compound, e.g., an organoaluminum compound.

19 Claims, No Drawings

POLYMERIZATION OF OLEFINS

BACKGROUND OF THE INVENTION

This invention relates to a process for polymerizing olefins. In another aspect, this invention relates to a novel catalyst system for the polymerization of alpha-olefins. In another aspect, this invention relates to a novel catalyst component to be used in the polymerization of alpha-olefins. In still another aspect, this invention relates to a method for preparing a novel catalyst system for the polymerization of alpha-olefins. In still another aspect, this invention relates to a method for preparing a novel catalyst component to be used for the polymerization of alpha-olefins. In another aspect, this invention relates to a process for the polymerization of alpha-olefins in the presence of a catalyst comprising a catalyst component which is obtained by treating a magnesium dihydrocarbyloxide compound-tetravalent, halogenated titanium compound reaction product with a dihydrocarbylmagnesium compound. In still another aspect, this invention relates to a catalyst system useful in the polymerization of alpha-olefins which comprises two components with the first component being obtained by mixing a magnesium dihydrocarbyloxide compound with a tetravalent, halogenated titanium compound and then contacting the resulting product with a dihydrocarbylmagnesium compound, and the second component is an organometallic compound.

It is known to polymerize alpha-olefins and mixtures thereof according to the low pressure process of Zeigler. In this process, the catalysts used are prepared from mixtures of compounds of elements of Subgroups IV to VI of the Periodic Table and the organometallic compounds of the elements of Groups I to III of the Periodic Table. The polymerization is generally carried out in suspension, in solution or even in the gaseous phase.

Furthermore, processes wherein a magnesium dihydrocarbyloxide compound is reacted with a compound of an element of Groups IV to VI of the Periodic Table are known. For example, according to U.S. Pat. No. 3,644,318 a compound of an element of Groups IV to VI from the Periodic Table, e.g., titanium tetrachloride, is reacted with a magnesium dihydrocarbyloxide compound, such as magnesium methoxide, to form a catalyst component. This catalyst component is then mixed with an organoaluminium compound as co-catalyst.

U.S. Pat. No. 3,901,863 discloses the reaction of a magnesium dihydrocarbyloxide (alkoxide), a titanium alkoxide and an aluminum halide compound to produce an active catalyst component. This catalyst component is then used with an organoaluminum co-catalyst for the polymerization of alpha-olefins.

U.S. Pat. No. 3,718,636 first reacts the magnesium alkoxide compound with an organometallic compound, e.g., trialkylaluminum is preferred, and then reacts the product with a halogenated derivative of a transition metal, e.g., titanium tetrachloride. The resulting catalyst component is then used with an organometallic compound such as triethylaluminum as co-catalyst for the polymerization of alpha-olefins.

The activity of an alpha-olefin polymerization catalyst is one important factor in the continuous search for the ultimate catalyst to be used in an alpha-olefin polymerization reaction. The present invention provides a novel catalyst which can be used in a process for polymerizing alpha-olefins and results in a high yield of polymer. The catalyst comprises two components. One catalyst component is obtained by mixing a magnesium dihydrocarbyloxide compound with a tetravalent, halogenated titanium compound and then contacting the resulting product with a dihydrocarbylmagnesium compound. This catalyst component is then mixed with a second component, namely, a metallic hydride or an organometallic compound wherein the metal is selected from an element of Groups IA, IIA and IIIA of the Periodic Table. The treatment of the product obtained by mixing the magnesium dihydrocarbyloxide compound and the tetravelent, halogenated titanium compound with a dihydrocarbylmagnesium compound results in a catalyst component with increased activity when mixed with an organometallic co-catalyst as compared to the catalyst system in U.S. Pat. No. 3,644,318, wherein the titanium-magnesium alkoxide reaction product is not treated with a dihydrocarbylmagnesium compound as in the present invention, and U.S. Pat. Nos. 3,901,863 and 3,718,636 wherein a catalyst component comprising a magnesium alkoxide and a titanium compound also incorporate an aluminum alkyl compound.

It is an object of this invention, therefore, to provide an improved process for the polymerization of alpha-olefins.

Another object of this invention is to provide a novel and improved catalyst for the polymerization of alpha-olefins.

Another object of this invention is to increase the yield of polymer in an alpha-olefin polymerization process.

Other objects, aspects and the several advantages of this invention will be apparent to those skilled in the art upon a study of this disclosure and the appended claims.

SUMMARY OF THE INVENTION

The present invention provides a process for the polymerization of alpha-olefins in the presence of a novel catalyst. Said catalyst comprises two components A and B. Novel catalyst component A is obtained by mixing a magnesium dihydrocarbyloxide compound with a tetravalent halogenated titanium compound and contacting the resulting product with a dihydrocarbylmagnesium compound. Component B comprises a hydride or an organometallic compound wherein said metal is selected from an element of Groups IA, IIA and IIIA of the Periodic Table.

In a specific embodiment of this invention, magnesium methoxide and titanium tetrachloride are mixed and then treated with dipentylmagnesium to thereby produce a catalyst component suitable as component A. Component A is then combined with an organoaluminum compound as a co-catalyst to form an active catalyst suitable for the polymerization of mono-1-olefins (alpha-olefins), such as ethylene.

DETAILED DESCRIPTION OF THE INVENTION

Active mono-1-olefin polymerization catalysts are prepared by mixing a magnesium dihydrocarbyloxide, which can be admixed with a magnesium dihalide or other inert diluent, and a tetravalent halogenated titanium compound, e.g., a titanium tetrahalide. The product, after removal of unreacted titanium compound by washing with a dry inert solvent, e.g., a dry hydrocarbon, is further treated with a dihydrocarbylmagnesium compound. The product, component A, is recovered and used with a co-catalyst, e.g., an organoaluminum compound, component B, to polymerize a mono-1-olefin, such as ethylene, or a mixture of a particular mono-olefin, such as ethylene, and another 1-olefin. Normally, solid polymer is recovered from the polymerization zone and it can be converted into film, molded articles and the like by means of extrusion, blow molding, and the like. In those copolymers containing ethylene, it is preferred that ethylene comprises at least 80 mole % of the copolymers when made.

Any suitable magnesium dihydrocarbyloxide can be employed for the purpose of forming novel catalyst component A as there is no restriction on the length of the hydrocarbyl groups outside of practical consideration, e.g., ease of preparation and availability. Exemplary magnesium dihydrocarbyloxides can be expressed by the formula $Mg(OR)_2$ in which R represents the same or different hydrocarbon group as alkyl, cycloalky, aryl, alkaryl, aralkyl, and grups of the like having 1 to about 12 carbon atoms per molecule. Specific examples of compounds include magnesium methoxide, magnesium ethoxide, magnesium methoxide-ethoxide, magnesium isopropoxide, magnesium dodecyloxide, magnesium phenoxide, magnesium cyclohexyloxide, and the like. One such useful compound because of availability or ease of preparation is magnesium methoxide.

The magnesium dihydrocarbyloxides can be prepared by known methods, for example, by reacting magnesium with alcohols, especially monohydric aliphatic alcohols. Magnesium methoxide can be prepared by reacting methanol with magnesium.

Any suitable tetravalent, halogenated titanium compound can be used as long as the titanium has one halogen attached thereto. Suitable compounds can be represented by the formula $TiX_a(OR)_{4-a}$ in which X stands for bromine, chlorine or iodine, or mixtures thereof, a is an integer of 1 to 4 and R is the same as described before. Specific examples of suitable compounds include titanium tetrachloride, titanium dibromodichloride, titanium iodotrichloride, n-butoxytrichlorotitanium, chlorotridodecyloxytitanium, bromotricyclohexyloxytitanium, diphenoxydichlorotitanium, and the like. A presently preferred compound is titanium tetrachloride because of availability and relatively low cost.

Appropriate dihydrocarbylmagnesium compounds for treating or contacting the reaction product of the magnesium dihydrocarbyloxide and tetravalent, halogenated titanium compound are not limited by the length of the hydrocarbyl groups except for possible practical considerations. Suitable and preferred dihydrocarbylmagnesium compounds can be represented by the formula $MgR'_2$ in which R' is the same or different and is a hydrocarbon radical selected from among alkyl, cycloalkyl, aryl, alkaryl, aralkyl and alkenyl groups having from 1 to about 12 carbon atoms per molecule. Exemplary compounds include dimethylmagnesium, dipentylmagnesium, didodecylmagnesium, diphenylmagnesium, dibenzylmagnesium, dicyclohexylmagnesium, di(4-t-butylphenyl) magnesium, and diisopropenylmagnesium.

The molar ratio of magnesium dihydrocarbyloxide in component A to that of dihydrocarbylmagnesium can range, generally, from about 10:1 to about 0.1:1.

The molar ratio of the magnesium dihydrocarbyloxide to the tetravalent, halogenated titanium compound can also range, generally, from about 10 to 1 to about 0.1 to 1.

Catalyst component A is prepared by mixing the magnesium dihydrocarbyloxide with the tetravalent, halogenated titanium compound, washing the product with an inert diluent or solvent to remove any unreacted titanium compound, and then contacting the washed product with the dihydrocarbylmagnesium compound. Conventional methods can be used for the mixing, reacting and contacting of the various compounds with a wide variance of conditions applicable.

The inert diluent can be an aliphatic or cycloaliphatic hydrocarbon such as butane, pentane, hexane, heptane, cyclohexane, methylcyclohexane, as well as aromatic hydrocarbons such as benzene and toluene. Generally, any well known inert hydrocarbon diluent can be used.

The contacting and mixing steps can be carried out generally at temperatures in the range of about 0° C. to about 150° C. with the decomposition temperatures of the tetravalent halogenated titanium compound and of the dihydrocarbylmagnesium compound determining the limits. It has been found that the initial contacting can be carried out advantageously at about 0° C. to avoid any premature reaction. The mixing temperature generally employed more preferably ranges from about 15°–100° C.

The length of the contacting period can vary greatly with the time period, generally, ranging from about 0.05 to about 20 hours.

As an example of the preparation of novel catalyst component A, catalyst component A can be conveniently prepared by contacting a solution or slurry of the $Mg(OR)_2$, optionally in the presence of $MgCl_2$, with the tetravalent, halogenated titanium compound either neat, if the titanium compound is a liquid, or, more preferably, as a solution in a dry, inert hydrocarbon diluent such as n-pentane, n-heptane, cyclohexane, etc. at about 0° C. When mixing is completed the flask and its contents are slowly heated to the refluxing temperature of the system and maintained at that temperature for a length of time from about 0.5 to about 10 hours. Refluxing times of about 4 hours, for example, does give good results. The mixture is allowed to cool, diluted and mixed with about 1-5 times its volume with a dry inert hydrocarbon of the type previously mentioned. Stirring is discontinued and the solids allowed to settle. The supernatant liquid is decanted and the washing, stirring, decanting process repeated enough times, e.g., 3-10 times, using fresh dry solvent each time, to remove unreacted titanium compound. After the final decanting the product is reslurried in fresh dry solvent, charged to a vessel, cooled to about 0° C. and contacted with a solution or slurry of the dihydrocarbyl magnesium compound. Following the contacting period, the reaction mixture is allowed to warm to room temperature and the solid material washed with fresh dry solvent in the manner already described. The solid material is freed of residual solvent by means of a vacuum system at temperature ranging from about 10°–150° C. The product is recovered and stored in a dry, inert atmosphere until it is needed.

Component B is a metallic hydride or organometallic compound wherein said metal is selected from Groups IA, IIA and IIIA of the Periodic Table. The preferred compound to be used as component B is an organoaluminum compound which can be represented by the formula $AlR'_b Y_{3-b}$ in which R' is the same or different and is a hydrocarbon radical selected from such groups as alkyl, cycloalkyl, aryl, alkaryl, aralkyl, alkenyl and the like having from 1 to about 12 carbon atoms per molecule, Y is a monovalent radical selected from among the halogens and hydrogen, and b is an integer of 0 to 3. Specific examples of organoaluminum compounds include trimethylaluminum, triethylaluminum, tridodecylaluminum, tricyclohexylaluminum, triphenylaluminum, tribenzylaluminum, diethylaluminum chloride, diisobutylaluminum hydride, ethylaluminum dibromide, and the like.

Any mono-1-olefin can be polymerized in the presence of the catalyst of the present invention with the preferred reactant being ethylene or ethylene plus another higher aliphatic mono-1-olefin containing from 3-10 carbon atoms. The mono-1-olefin, or mixture thereof, is polymerized by contact with the catalyst system of this invention, using any of the well known methods, e.g., by contacting in solution, in suspension or in gaseous phase at temperatures ranging from about 20°-200° C. and pressures ranging from about atmospheric to about 1000 psig (6.9 MPa g). The homopolymerization and copolymerization reactions can be conducted batchwise or in continuous fashion by employing any known process.

It is convenient when polymerizing ethylene in a bench scale process, for example, to conduct the polymerization batchwise in a stirred reactor employing a dry hydrocarbon diluent inert in the process such as isobutane, n-heptane, methylcyclohexane, benzene, toluene and the like, at a reactor temperature of about 80° C. and a reactor pressure of about 280 psig (1.9 MPa). Ethylene is admitted to the reactor as required to maintain the desired pressure. Molecular weight control agents such as hydrogen can be employed in the reactor, as known in the art, to adjust the molecular weight of the polymer.

When the selected polymerization time is reached the reaction can be terminated by discontinuing the flow of ethylene and comonomer, if used, venting unreacted monomer(s) and diluent and recovering the polymer. The recovered product can be treated to deactivate or remove catalyst residues such as by an alcohol wash, can be stabilized by admixture with an antioxidant(s) and can be dried to remove residual solvent, if present, as is known in the art. Generally, because such low amounts of catalyst residues are present in the polymer product it is not necessary to remove them to avoid discoloration of the polymer or corrosion of processing equipment. Thus, it is usually only necessary to stabilize the polymer after recovery and dry it before it is further processed into pellets and/or converted into the final shaped product.

The following examples are set forth as illustrative of this invention and are not meant to be restrictive in any way.

EXAMPLE 1

A suspension of magnesium methoxide in n-hexane (156 ml, containing 50 mmoles Mg) was charged to a 500 ml round bottom flask arranged for refluxing, inert gas blanketing, and magnetic stirring. The flask and contents were cooled to 0° C. and to it was added 50 ml of titanium tetrachloride (455 mmoles Ti) while stirring so that the temperature of the mixture remained at 0° C. The calculated molar ratio of $Mg(OCH_3)_2/TiCl_4$ was 0.11:1. Over a 1 hour period the mixture was warmed until refluxing temperature (about 67° C.) was reached after which refluxing was continued for 4 hours. The mixture was then cooled to room temperature (about 23° C.), diluted to 500 ml with dry n-hexane and stirred for 30 minutes. Stirring was discontinued, the mixture was allowed to settle about 30 minutes after which the supernatant liquid amounting to about 400 ml was decanted. About 400 ml of dry n-hexane was added to the flask and the contents reslurried, allowed to settle and supernatant liquid decanted as before. A total of 4 slurrying-decantings was employed to wash the initial product. Following the final washing, about 400 ml of dry n-hexane was added to the contents of the flask and the contents reslurried as before to obtain a total volume of 500 ml. An aliquot of the slurry was then charged to a series of dry, 10 oz. (296 ml) beverage bottles, previously sealed with rubber septums and purged with dry nitrogen. Each bottle and contents was cooled to 0° C. and a specified quantity of an organometal compound was added. Following the addition, the bottles and contents were allowed to warm to room temperature. Each bottle was filled with dry n-hexane, the contents agitated, allowed to settle and the supernatant liquid decanted. Additional dry n-hexane was added to each bottle, the contents agitated, allowed to settle and supernatant liquid decanted as before. Residual n-hexane was removed in vacuo at ambient temperature and the contents of each bottle transferred to a dry container for storage.

The quantity and nature of each organometal compound used as a solution in n-hexane of n-heptane to react with a specified aliquot of the magnesium methoxide-titanium tetrachloride reaction product are given in Table 1. In the table TEA is triethylaluminum (15 wt% in n-heptane), DEAC is diethylaluminum chloride (25 wt% in n-heptane) and $MgR'_2$ is dipentylmagnesium contained in n-hexane corresponding to 2.58 mg Mg/ml (0.106 mmole Mg/ml).

TABLE I

| Run No. | Aliquot Charged (ml) | calc mmoles Mg | Organometal Charged Compound | ml | calc mmoles | Calculated Mole Ratio $Mg(OR)_2$/ Organometal Compound |
|---|---|---|---|---|---|---|
| 1 | 85 | 8.5 | TEA | 8.5 | 7.8 | 1.1 |
| 2 | 80 | 8.0 | DEAC | 5.0 | 7.6 | 1.1 |
| 3 | 80 | 8.0 | EASC | 5.3 | 4.1 | 2.0 |
| 4 | 80 | 8.0 | $MgR'_2$ | 75 | 7.9 | 1.0 |
| 5 | 80 | 8.0 | none | 0 | 0 | not applicable |

Example 2

A dry, stainless steel reactor of 1 gallon (3.8 liter) capacity, arranged for stirring, containing about 3 liters of dry n-heptane was heated to 175° C. for about 30 minutes. The reactor was drained, residual n-heptane purged with a stream of dry nitrogen and the closed nitrogen-filled reactor cooled to room temperature (about 23° C.). The cool reactor was purged with isobutane vapor, a solution of the cocatalyst, component B was charged to it and the catalyst, component A was then introduced into the reactor. After 2 liters of isobutane was added, the reactor and contents were heated to 80° C. and 100 psig (0.60 MPa) ethylene pressure charged. Additional ethylene is admitted as required during the polymerization to maintain the pressure. After 1 hour on stream, each run was terminated by venting the ethylene and isobutane and the polymer was recovered and weighed.

Triethylaluminum (TEA) was added as a 15 wt% solution in n-heptane. Diethylaluminum chloride (DEAC) was added as a 25 wt% solution in n-heptane. The amount of each cocatalyst charged per run was 3 ml.

Calculated productivity values are based on the grams polyethylene obtained per gram of catalyst component A per hour.

The quantities of reactants employed and the results obtained are presented in Table 2.

TABLE 2

Ethylene Polymerization with Table 1 Catalysts

| Run No. | Catalyst Table 1 No. | g | Cocatalyst Compound | mmoles Compound | Polymer Yield, g | Productivity g/g/hr | Remarks |
|---|---|---|---|---|---|---|---|
| 6  | 1 | 0.0076 | TEA  | 2.7 | 42  | 5530  | Control |
| 7  | 2 | 0.0159 | TEA  | 2.7 | 81  | 5090  | " |
| 8  | 3 | 0.0202 | TEA  | 2.7 | 73  | 3610  | " |
| 9  | 4 | 0.0054 | TEA  | 2.7 | 134 | 24800 | Invention |
| 10 | 4 | 0.0159 | DEAC | 4.6 | 392 | 24600 | " |
| 11 | 5 | 0.0101 | TEA  | 2.7 | 58  | 5740  | Control |

The results obtained demonstrate that treating a reaction product of magnesium methoxide and titanium tetrachloride with dipentylmagnesium under the specified conditions yields an active catalyst (component A) for the polymerization of ethylene. The polymerization results indicate that triethylaluminum, run 4, or diethylaluminum chloride, run 5, are excellent cocatalysts (component B) to use with the invention catalysts.

Control runs, using catalysts prepared by reacting various organoaluminum compounds with the magnesium methoxide-titanium tetrachloride reaction product, show that such catalysts are much less active, about 0.1-0.2 as active based on productivity results, than the invention catalysts.

EXAMPLE 3

As in the manner of Example 1, 78 ml (24.9 mmoles Mg) of the same magnesium methoxide was added to the flask. The flask and contents were cooled to 0° C. and to it was added 25 ml of titanium tetrachloride (227.5 mmoles Ti) so that the temperature of the mixture never exceeded 0° C. The calculated mole ratio of $Mg(OCH_3)_2/TiCl_4$ was again 0.11. Over a 1 hour period the mixture was warmed to reflux temperature (about 67° C.) and refluxed for 4 hours. The mixture was cooled to room temperature (about 23° C.), diluted with dry n-hexane to a volume of 500 ml and stirred 30 minutes. The mixing was stopped and the mixture allowed to stand for about 30 minutes and the supernatant liquid decanted. This operation was repeated 3 more times. The flask was refilled with fresh n-hexane and the bottle under a nitrogen blanket allowed to stand over the weekend (2 days). At that time the supernatant liquid was decanted and the bottle filled to 250 ml with fresh n-hexane. The slurry was calculated to contain 0.099 mmoles Mg/ml. An aliquot of 80 cc (7.92 mmoles Mg) was transferred to a 10 oz. beverage bottle as before and cooled to 0° C. To the bottle was then added 75 ml (7.9 mmoles Mg) of the dipentylmagnesium reagent used in the first example. Thus the calculated mole ratio of Mg based on $Mg(OCH_3)_2$ was 1. The bottle and contents were allowed to warm to room temperature and treated as described in the first example. A sample of the slurry remaining in the flask was removed and dried to provide a control.

Samples of each catalyst were individually charged to the reactor and ethylene was polymerized in the presence of the same cocatalysts in the manner exactly as described in Example 2. The results are given in Table 3.

TABLE 3

| Run No. | Catalyst g | Ethylene Polymerization Cocatalyst Compound | mmoles Compound | Polymer Yield,g | Productivity g/g/hr | Remarks |
|---|---|---|---|---|---|---|
| 12 | 0.0142 | TEA  | 2.7 | 303 | 21,300 | Invention-treated |
| 13 | 0.0059 | DEAC | 4.8 | 220 | 37,300 | Invention-treated w/$Mg(OCH_3)_2$ |
| 14 | 0.0049 | TEA  | 2.7 | 35  | 7,140  | Control-no treatment |
| 15 | 0.0042 | DEAC | 4.8 | 13  | 3,100  | Control-no treatment |

The results obtained confirm that very active catalysts can be prepared according to the method described in the instant invention. The methods employed in examples 1 and 3 are identical. The quantities of reactants employed in example 3 are about ½ those employed in the first example.

Reasonable variations and modifications which will become apparent to those skilled in the art can be made in the present invention without departing from the spirit and scope thereof.

I claim:

1. A catalyst component obtained by mixing a magnesium dihydrocarbyloxide compound with a tetravalent, halogenated titanium compound having the formula $TiX_a(OR)_{4-a}$ in which R represents an identical or different hydrocarbon group, a is an integer from 1 to 4 and X is selected from the group consisting of bromine, chlorine and iodine with X being the same halogen or different halogens when a is greater than 1 and contacting the resultant product after removal of unreacted titanium compound with a dihydrocarbylmagnesium compound.

2. A catalyst component obtained by
   mixing a magnesium dihydrocarbyloxide having the formula $Mg(OR)_2$ in which R represents an identical or different hydrocarbon group with a tetravalent, halogenated titanium compound having the formula $TiX_a(OR)_{4-a}$ in which R is defined as above, a is an integer from 1 to 4 and X can be selected from the group consisting of bromine, chlorine and iodine with X being the same halogen or different halogens when a is greater than 1, to thereby form a product, washing the product with an inert solvent to remove any unreacted titanium compound, and contacting the washed product with a dihydrocarbylmagnesium compound having the formula $MgR'_2$ wherein R' is a hydrocarbon radical selected from the group consisting of alkyl, cycloalkyl, aryl, alkaryl, aralkyl, and alkenyl groups having from 1 to about 12 carbon atoms.

3. A catalyst component in accordance with claim 2 wherein R is a hydrocarbon group having from 1 to about 12 carbon atoms.

4. A catalyst component in accordance with claim 2 wherein said magnesium dihydrocarbyloxide is magnesium methoxide, said tetravalent, halogenated titanium compound is titanium tetrachloride, and said dihydrocarbylmagnesium compound is dipentylmagnesium.

5. A catalyst component in accordance with claim 2 wherein the molar ratio of magnesium dihydrocarbyloxide in the catalyst component to that of the dihydrocarbyl magnesium compound is in the range of about 10:1 to about 0.1:1, and the molar ratio of magnesium dihydrocarbyloxide to titanium compound is in the range of about 10:1 to about 0.01:1.

6. A method for preparing a catalyst component comprising mixing a magnesium dihydrocarbyloxide having the formula $Mg(OR)_2$ in which R represents an identical or different hydrocarbon group with a tetravalent, halogenated titanium compound having the formula $TiX_a(OR)_{4-a}$ in which R is defined as above, a is an integer from 1 to 4 1 and X can be selected from the group consisting of bromine, chlorine and iodine with X being the same halogen or different when a is greater than 1, to thereby from a product.

washing the product with an inert solvent to remove any unreacted titanium compound, and contacting the washed product with a dihydrocarbylmagnesium compound having the formula $MgR'_2$ wherein R' is a hydrocarbon radical selected from the group consisting of alkyl, cycloalkyl, aryl, alkaryl, aralkyl, and alkenyl groups having from 1 to about 12 carbon atoms, recovering the solid catalyst component.

7. A method in accordance with claim 6 wherein the magnesium dihydrocarbyloxide is mixed in the presence of $MgCl_2$.

8. A method in accordance with claim 6 wherein the mixing of the magnesium dihydrocarbyloxide and titanium compound and the contacting of the dihydrocarbylmagnesium with said washed reaction product is initially performed at a temperature of about 0° C.

9. Catalyst for the polymerization and copolymerization of alphaolefins comprising two components wherein component A is obtained by mixing a magnesium dihydrocarbyloxide having the formula $Mg(OR)_2$ in which R represents an identical or different hydrocarbon group with a tetravalent, halogenated titanium compound having the formula $TiX_a(OR)_{4-1}$ in which R is defined as above, a is an integer from 1 to 4 and X can be selected from the group consisting of bromine, chlorine and iodine with X being the same halogen or different halogens when a is greater than 1, to thereby form a product, washing the product with an inert solvent to remove any unreacted titanium compound, and contacting the washed product with a dihydrocarbylmagnesium compound having the formula $MgR'_2$ wherein R' is a hydrocarbon radical selected from the group consisting of alkyl, cycloalkyl, aryl, alkaryl, aralkyl, and alkenyl groups having from about 1 to about 12 carbon atoms, and component B is a metallic hydride or organometallic compound wherein said metal is selected from an element of Groups IA, IIA and IIIA of the Periodic Table.

10. A catalyst in accordance with claim 9 wherein component B is an organoaluminum compound.

11. A catalyst in accordance with claim 10 wherein the organoaluminum compound is selected from the group consisting of trimethylaluminum, triethylaluminum, tridodecylaluminum, tricyclohexylaluminum, triphenylaluminum, tribenzylaluminum, diethylaluminum chloride, diisobutylaluminum hydride and ethylaluminum dibromide.

12. A catalyst in accordance with claim 9 wherein the magnesium dihydrocarbyloxide is selected from the group consisting of magnesium methoxide, magnesium ethoxide, magnesium methoxide-ethoxide, magnesium isopropoxide, magnesium dodecyloxide, magnesium phenoxide, and magnesium cyclohexyloxide.

13. A catalyst in accordance with claim 9 wherein the tetravalent, halogenated titanium compound is selected from the group consisting of titanium tetrachloride, titanium dibromodichloride, titanium iodotrichloride, n-butoxytrichlorotitanium, chlorotridodecyloxytitanium, bromotricyclohexyloxytitanium and diphenoxydichlorotitanium.

14. A catalyst in accordance with claim 13 wherein the dihydrocarbylmagnesium compound is selected from the group consisting of dimethylmagnesium, dipentylmagnesium, didodecylmagnesium, diphenylmagnesium, dibenzylmagnesium, dicyclohexylmagnesium, di(4-t-butylphenyl)magnesium and diisopropenylmagnesium.

15. A catalyst in accordance with claim 9 wherein the magnesium dihydrocarbyloxide is magnesium methoxide, the tetravalent, halogenated titanium compound is titanium tetrachloride, the dihydrocarbylmagnesium compound is dipentylmagnesium and component B is selected from the group consisting of triethylaluminum and diethylaluminum chloride.

16. A catalyst in accordance with claim 9 wherein the molar ratio of the content of magnesium dihydrocarbyloxide in the catalyst component to that of the dihydrocarbylmagnesium compound is in the range of about 10:1 to about 0.1:1, and the molar ratio of magnesium dihydrocarbyloxide to titanium compound is in the range of about 10:1 to about 0.01:1.

17. A method for the preparation of a catalyst which comprises mixing a magnesium dihydrocarbyloxide having the formula $Mg(OR)_2$ in which R represents an identical or different hydrocarbon group with a tetravalent, halogenated titanium compound having the formula $TiX_a(OR)_{4-a}$ in which R is defined as above, a is an integer from 1 to 4 and X can be selected from the group consisting of bromine, chlorine and iodine with X being the same halogen or different when a is greater than 1, to thereby form a product, washing the product with an inert solvent to remove an unreacted titanium compound, contacting the washed product with a dihydrocarbylmagnesium compound having the formula MgR'$_2$ wherein R' is a hydrocarbon radical selected from the group consisting of alkyl, cycloalkyl, aryl, alkaryl, aralkyl, and alkenyl groups having from 1 to about 12 carbon atoms, recovering the solid catalyst component, and then combining the resultant catalyst component with a metallic hydride or organometallic compound wherein said metal is selected from an element of groups IA, IIA, and IIIA of the Periodic Table.

18. A method in accordance with claim 17 wherein the magnesium dihydrocarbyloxide is mixed in the presence of MgCl$_2$.

19. A method in accordance with claim 17 wherein the mixing of the magnesium dihydrocarbyloxide and titanium compound and the contacting of the dihydrocarbylmagnesium with said washed reaction product is initially performed at a temperature of about 0° C.

* * * * *